(12) United States Patent
Tian

(10) Patent No.: US 7,369,528 B2
(45) Date of Patent: May 6, 2008

(54) METHOD AND SYSTEM TO SEND SMS MESSAGES IN A HYBRID NETWORK

(75) Inventor: Lu Tian, Plano, TX (US)

(73) Assignee: Alcatel-Lucent, Paris (FR)

( * ) Notice: Subject to any disclaimer, the term of this patent is extended or adjusted under 35 U.S.C. 154(b) by 0 days.

(21) Appl. No.: 10/499,613

(22) PCT Filed: Dec. 19, 2002

(86) PCT No.: PCT/US02/40897

§ 371 (c)(1),
(2), (4) Date: Jun. 18, 2004

(87) PCT Pub. No.: WO03/061168

PCT Pub. Date: Jul. 24, 2003

(65) Prior Publication Data

US 2005/0083918 A1    Apr. 21, 2005

Related U.S. Application Data

(60) Provisional application No. 60/342,780, filed on Dec. 21, 2001.

(51) Int. Cl.
*H04B 7/216* (2006.01)
(52) U.S. Cl. .......... 370/335; 370/342; 370/356; 370/465

(58) Field of Classification Search ............ 370/310, 370/315, 320, 328, 331, 335, 338, 342, 349, 370/355, 356, 465, 466, 467; 455/422.1, 455/560, 561
See application file for complete search history.

(56) References Cited

U.S. PATENT DOCUMENTS

| 6,161,007 | A * | 12/2000 | McCutcheon et al. ... 455/412.2 |
| 6,320,873 | B1 * | 11/2001 | Nevo et al. ................. 370/466 |
| 6,400,712 | B1 * | 6/2002 | Phillips ...................... 370/355 |
| 6,438,117 | B1 * | 8/2002 | Grilli et al. ................. 370/331 |
| 6,681,111 | B2 * | 1/2004 | Ahn et al. ............... 455/432.2 |
| 6,731,926 | B1 * | 5/2004 | Link et al. .............. 455/412.2 |
| 6,873,858 | B1 * | 3/2005 | Aguilar et al. ........... 455/552.1 |
| 2002/0110104 | A1 * | 8/2002 | Surdila et al. ............. 370/338 |
| 2002/0160781 | A1 | 10/2002 | Bark et al. ................. 455/450 |
| 2003/0224811 | A1 * | 12/2003 | Jain et al. .................. 455/466 |

* cited by examiner

*Primary Examiner*—Chi Pham
*Assistant Examiner*—Shick Hom

(57) ABSTRACT

Embodiments of a method and system are disclosed to pass SMS messages from a mobile operating in a CDMA Radio Access Network to a Hybrid MSC, and to route the SMS message from the Hybrid MSC to a GSM SMS-C in the Core network, the hybrid wireless network having at least one radio access network (RAN) based on CDMA technology and a core network (CN) based on GSM technology.

9 Claims, 4 Drawing Sheets

METHOD AND SYSTEM TO SEND SMS MESSAGES IN A HYBRID NETWORK

CROSS REFERENCE TO RELATED APPLICATION

This application claims the benefit of the filing date of U.S. provisional patent application Ser. No. 60/342,780, filed on Dec. 21, 2001, entitled "Method and System oo Send GSM SMS Message Over CDMA Radio Network to a GSM Destination SMS Service Centre in the Core Network."

BACKGROUND OF THE INVENTION

The present disclosure relates generally data communications, and more particularly, to a system and method for providing Short Message Service (SMS) to a wireless mobile terminal operating in a hybrid wireless network.

A typical wireless network is composed of two subnetworks: a Radio Access Network (RAN) which handles radio related issues such as assigning radio resources to a mobile terminal (or "mobile" in short) upon request for services, and a Core Network (CN) which links the mobile user to wireline networks. Current specifications of wireless networks require that the RAN and CN have the same wireless technology in order to provide wireless services. These networks may be referred to as "homogeneous networks." For instance, a GSM mobile will only operate in a wireless network which its RAN and CN are both GSM wireless technology based. FIG. 1 illustrates a GSM wireless network 100 composed of a GSM RAN 102 and a GSM CN 104.

The GSM RAN 102 includes a GSM Mobile Station (MS) 106 that communicates to a GSM Base Station System (BSS) 108 through a GSM radio channel 110. The GSM BSS 108 includes a GSM Base Transceiver Station (BTS) 110 and GSM Base Station Controller (BSC) 112.

The GSM Core Network (CN) 104 includes a GSM Mobile Switching Center (MSC) 120 that is connected to the GSM BSC 112 as well as a GSM Gateway MSC (GMSC) 122 by using SS7 ISUP communications 124. The GSM GMSC 122 is also connected to the Public Switched Telephone Network (PSTN) 126 by using SS7 ISUP communications 124. In this figure, a telephone 128 is shown to be connected to the PSTN 126 as an illustration of a calling/called party. In addition, a Serving General Packet Radio Service Node (GPRS) (SGSN) 130 is shown to also be connected to the GSM BSC 112. Moreover, a GSM Short Message Service Center (SMS-C) 132, a GSM Home Location Register (HLR) 134 and a GSM Authentication Center (AuC) 136 are all shown to be connected the GSM MSC 120 and the SGSN 130. Further, a GSM Service Control Point (SCP) 138 connects a GSM Billing System 140 to the GSM MSC 120 and the GSM HLR 134. The connection from the GSM Billing System 140 and the GSM MSC 120 utilizes IP. Additionally, a Packet Data Network (PDN) 142 is shown connected to the GSM CN 104 through a Gateway GPRS Node (GGSN) 144 utilizing IP communications.

A disadvantage of the homogeneous network is that, given many wireless technologies that exist today and considering new ones being defined for the future, this is a serious limitation in the wireless service provision to deal with a situation in which a mobile compatible with one wireless technology moves into a wireless network of different technology. This prevents the mobile from getting services and limits the mobile's geographical service area to networks that support a specific wireless technology. The same limitation applies to wireless networks that are CDMA wireless technology based. FIG. 2 illustrates such a CDMA based network 200.

Turning to FIG. 2, a CDMA RAN 201 includes a CDMA MS 202 connected to a CDMA BSS 204 through a CDMA BTS 206. The CDMA BTS 206 is in turn connected to a CDMA BSC 208, which connects to a Packet Control Function (PCF) 210. A CDMA CN 212 connects to the CDMA RAN 201 by the CDMA BSC 208 connecting to a CDMA200 MSC 214. The CDMA MSC 214 is connected to an IS-41 SMS-C 216, an IS-41 HLR 218, an IS-41 AuC 220 and an IS-41 SCP 222. The IS-41 SCP 222 in turn is also connected to the IS-41 HLR 218 and a Store and Forward Service 224, which in turn is connected to an IS-41 Billing System 226. In addition, a Packet Data Serving Node (PDSN) 228 is connected to the PCF 210 of the CDMA RAN 200 and a PDN 230. Moreover, the CDMA MSC 214 connects the CDMA CN 212 to a PSTN 232 and, for illustrative purposes, a phone 234.

A hybrid wireless network is a wireless network composed of a RAN and a CN of different technologies linked. Although hybrid wireless networks have advantages, one difficulty is to enable the mobile terminal in the RAN and certain network entities in the CN to exchange message contents without being obstructed by the differences in the technologies involved (e.g., message encoding and decoding schemes). For instance, consider the short message service (SMS) in a GSM Network. When a GSM handset sends a Mobile Originated (MO) short message to the GSM MSC, the message contains not only the destination address but also the address of the SMS-C or Short Message Service Center. In GSM networks, each GSM subscriber may have different address of the SMS-C because the address of the SMS-C is stored in the GSM subscriber's SIM card. In contrast, a CDMA network typically uses a centralized SMS service centre to deliver short message. Consequently, the CDMA handset sends only the destination address for the MO short message. Thus, in the CDMA protocol between the CDMA handset and the MSC, the service centre address is not communicated.

If a hybrid network system were created where a GSM SIM card could be inserted into the CDMA handset, a MO short message could be sent from the CDMA mobile handset to a hybrid MSC. However, the standard CDMA protocol is still used between the CDMA handset and the Hybrid MSC. Under the standard CDMA protocol the GSM service centre address would not be sent to the Hybrid MSC. What is needed, therefore, is a method and system for providing sending SMS messages from the mobile to a hybrid MSC in a hybrid system and a routing mechanism in the hybrid MSC to route the SMS message to the appropriate SMS-C in the core network.

SUMMARY OF THE INVENTION

Embodiments of a method and system are disclosed to pass SMS messages from a mobile operating in a CDMA RAN to a Hybrid MSC, and to route the SMS message from the Hybrid MSC to a GSM SMS-C in the Core network, where the hybrid wireless network having at least one radio access network (RAN) based on CDMA technology and a core network (CN) based on GSM technology.

When the mobile has an SMS message ready for transmission, the message is first encoded based on the GSM SMS encoding scheme, then it is inserted in a CDMA message so that it can be sent on the CDMA radio network transparently. The destination address of the message is also encoded by the mobile before sending the message. The destination address includes an embedded address that will be used by the Hybrid MSC to route the message to the appropriate SMS-C. In one embodiment, ADSS message type is used on the CDMA RAN to transfer the SMS message to the Hybrid MSC.

Once the message reaches the Hybrid MSC, the latter will remove all CDMA related headers and extract the embedded destination address. The Hybrid MSC then routes the SMS message to the appropriate GSM SMS-C in the Core network using the embedded address. The remaining of the process follows the same procedures used in existing SMS-C in GSM CNs.

In the illustrative embodiments, no modifications need to be introduced to the GSM core network specifications, creating advantages for network operators that are looking to expand their wireless service coverage of a new radio technology. Also, the present disclosure needs very low cost and short deployment time because that the core network does not have to be modified.

The disclosed embodiments modify the CDMA SMS protocol so that the CDMA handset can send the GSM SMS-C address as well as the destination address to the GSM MSC. However, the modification is transparent to the Base Station System (BSS) and therefore no change at the BSS is required.

DESCRIPTION OF THE PREFERRED EMBODIMENT

For the purposes of the present disclosure, various acronyms are used, and the definitions of which are listed below:

| | |
|---|---|
| BSC | Base Station Centre |
| BSS | Base Station System |
| BTS | Base station Transceiver System |
| CN | Core Network |
| GGSN | Gateway GPRS Support Node—a wireless gateway that allows mobile cell phone users to access the public data network (PDN) or specified private IP networks. |
| GMSC | Gateway MSC |
| GPRS | General Packet Radio Services |
| GSM | Global System for Mobile communications |
| HLR | Home Location Register |
| IP | Internet Protocol |
| IS41 | Wireless Network conforming to the IS41 standard |
| ISDN | Integrated Services Digital Network |
| ISUP | ISDN User Part (of SS7) |
| MO | Mobile Originated |
| MSC | Mobile Switching Centre |
| PSTN | Public Switch Telephone Network |
| RAN | Radio Access Network |
| SIM | Subscriber Identity Module |
| SGSN | Serving GPRS Support Node—sends data to and receives data from mobile stations, and maintains information about the location of a mobile station. The SGSN communicates between the MS and the GGSN. |
| SMS | Short Message Service—a means by which short text messages can be sent over the air from base stations to pagers, cell phones, or other handheld devices. Alpha-numeric messages up to 160 characters are supported. |
| SMS-C | Short Message Service Center—the entity that stores and forwards Short Message Service ("SMS") messages. |

The present disclosure provides several examples below, and it is understood that the examples are not necessarily limitations to the present disclosure, but are used to describe embodiments of the method and system of the present disclosure.

Figure 3:
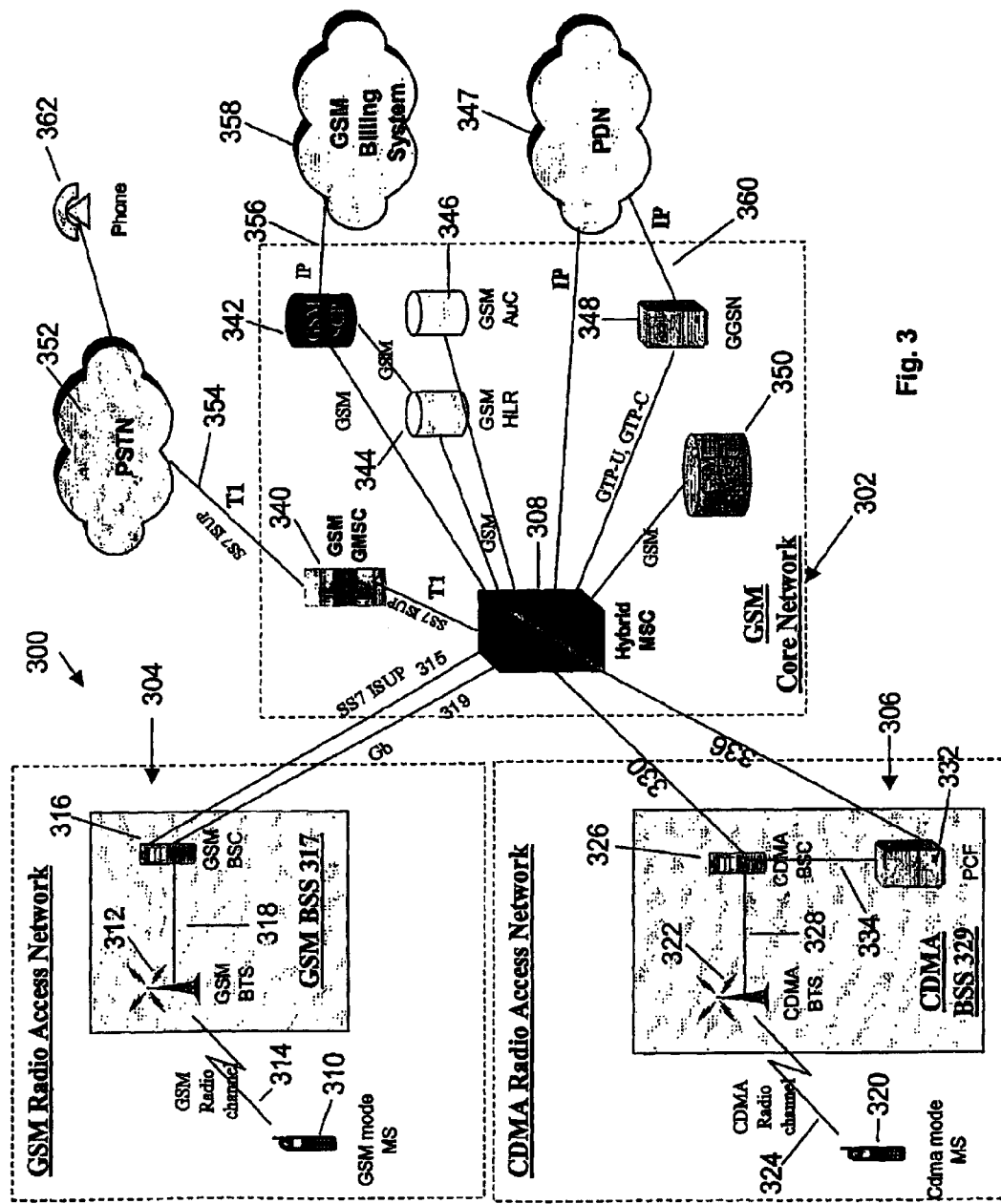
FIG. 3 illustrates a hybrid wireless network architecture with a Hybrid Mobile Switching Center and utilizing the CDMA wireless technology in the RAN and GSM wireless technology in the CN according to one example of the present disclosure.

FIG. 3 illustrates an example hybrid wireless network 300 which could be used to implement one aspect of the present invention. The wireless network 300 includes a GSM CN 302, which may be in communication with a GSM RAN 304 and/or a CDMA RAN 306. The RAN 304 and 306 communicate with the CN 302 through a Hybrid Mobile Switching Center (HMSC) 308. In this example, the HMSC 308 has a centralized call control model for voice and packet data calls. This module allows the HMSC 308 to handle and keep track of all calls for a given mobile phone. In contrast, in a traditional GSM MSC or a CDMA MSC the call control for data and voice are located in different network entities. In this example embodiment, setting-up and controlling a voice or a data call for a mobile user is performed at the HMSC 308.

The illustrative network 300 may provide both voice and packet data services to mobile stations in either of the two networks. For instance, in the GSM RAN 304, a GSM mobile unit 310 communicates with a GSM BTS 312 over a GSM radio link 314. In this illustrative embodiment, the GSM mobile unit 310 is a dual mode GSM/CDMA unit having a SIM card (not shown). The GSM BTS 312 typically communicates with a GSM BSC 316 using a wired link 318. The BTS 312 and BSC 316 comprise a base station system or BSS 317. In the illustrative embodiments, the HMSC 308 communicates with the GSM BSC 316 over a voice link 315 using an SS7 ISUP protocol and over a data link 319 using a Gb protocol.

Similarly, in the CDMA RAN 306, a CDMA 2000 mobile phone 320 communicates with a CDMA BTS 322 over a CDMA radio link 324. The CDMA BTS 322 typically communicates with a CDMA BSC 326 using a proprietary wired link 328. Typically, for voice communications, the CDMA BSC 326 communicates with the HMSC 308 over a link 330 using a variety of protocols, including A1, A2, A5, A8, and A9. The CDMA BSC 326 transfers data to a PCF 332 over a link 334 using A8 and A9 protocols. Thus, data is usually sent by the PCF 332 to the HMSC 308 over a link 336 using the A10 and A11 protocols.

Figure 2:
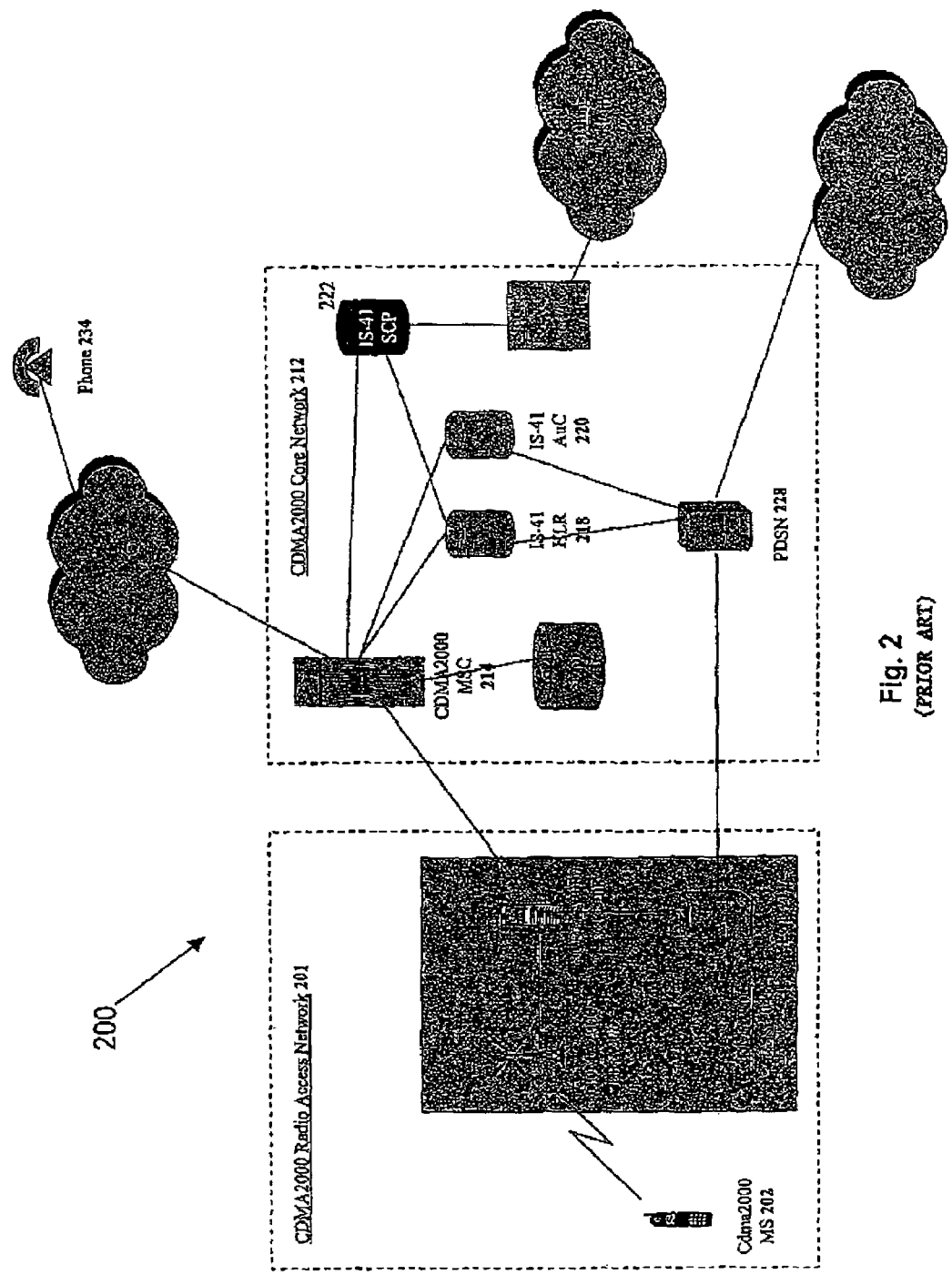
FIG. 2 illustrates a CDMA wireless network architecture for providing services to a mobile terminal.

If the core network is a GSM network, as in the illustrative network 300, the HMSC 308 communicates with the other GSM network components in much the same way a typical MSC would communicate with the GSM network components. For instance, the HMSC 308 may establish links with a GMSC 340, a SCP 342, an HLR 344, a AuC 346, a PDN 347, a GGSN 348, and/or a SMS-C 350. Similarly, the GMSC 340 may communicate with a PSTN 352 through a T1 link 354 using a SS7 ISUP protocol as previously described in reference to FIG. 2. Additionally, the SCP 342 may establish a link 356 with a billing system 358, and the GGSN 348 may establish a link 360 with the PDN 347, where the links 356 and 360 uses an IP protocol. Thus, for each connection, FIG. 3 illustrates an example link and the corresponding communication protocol used to allow communication between typical network entities. As those skilled in the art would recognize, similar communication links may be established if the CN 302 were a CDMA network.

Figure 1:
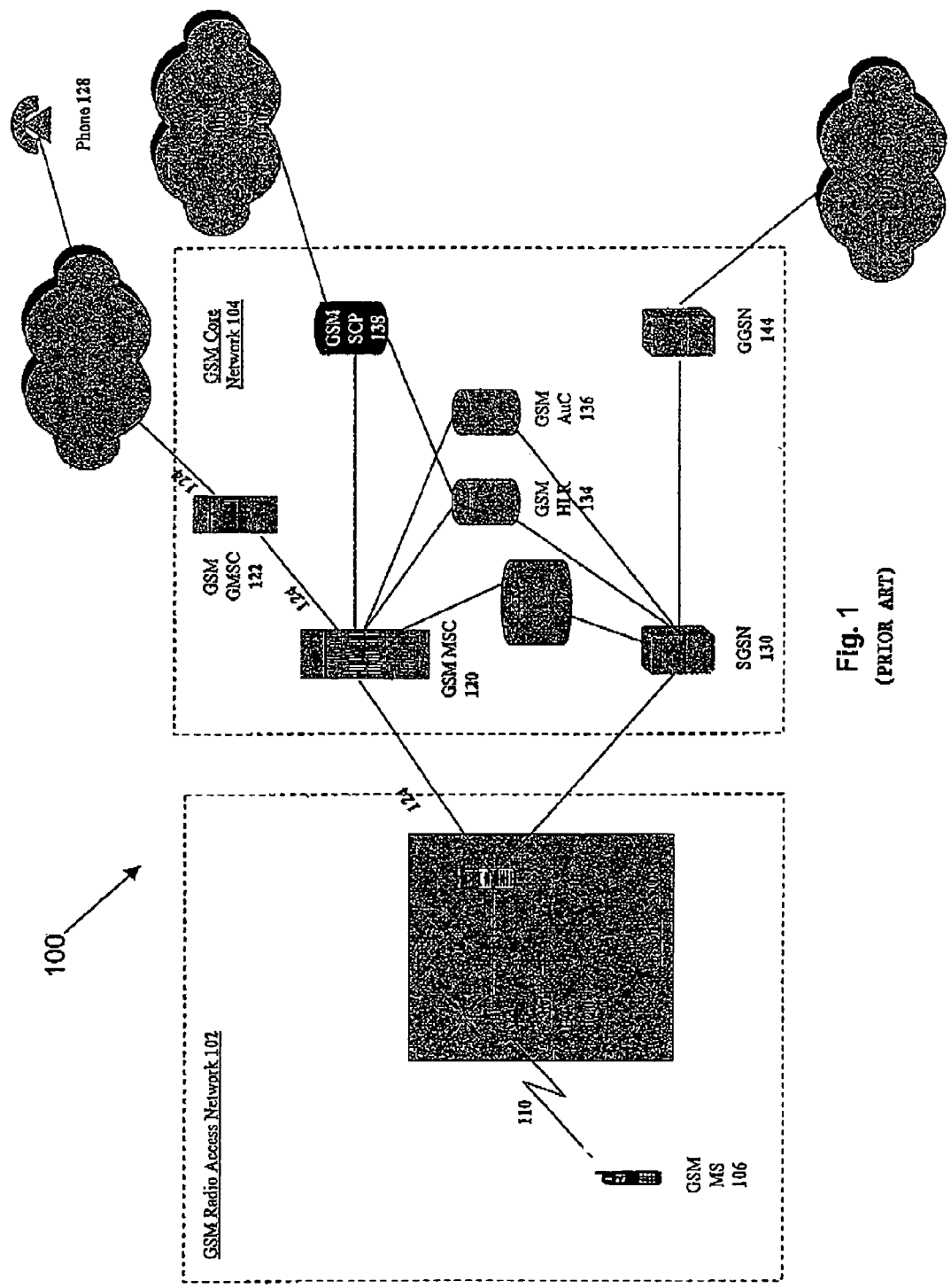
FIG. 1 illustrates a GSM wireless network architecture for providing services to a mobile terminal.

Thus, for calls established with the GSM mobile 310, the HMSC 308 acts like a GSM MSC 110 as depicted in FIG. 1. For calls established with the CMDA mobile 320, the HMSC 308 links the CDMA RAN 304 to the GSM CN 302 by translating and mapping CDMA RAN messages initiated in the RAN 304 into GSM CN messages sent to the CN 302, and GSM messages initiated by the CN 302 into CDMA messages sent to the RAN 306.

The HMSC 308 may support voice and packet data call services from mobiles in any type of RAN to any other type of network. For instance the mobile 310 in the GSM RAN 304 can make a call to another mobile (not shown) operating in the CDMA RAN 306, a telephone 362 connected to the PSTN 352, or an entity as part of the PDN 347 and other networks that are not illustrated nor discussed in this disclosure for reasons of simplicity and clarity. The HMSC 308 is shown in communication with two RANs of different technologies, however as would be clear to one skilled in the art, the present invention also applies in situations where the HMSC 308 is in communication with one or more RANs of same technology.

Figure 4:
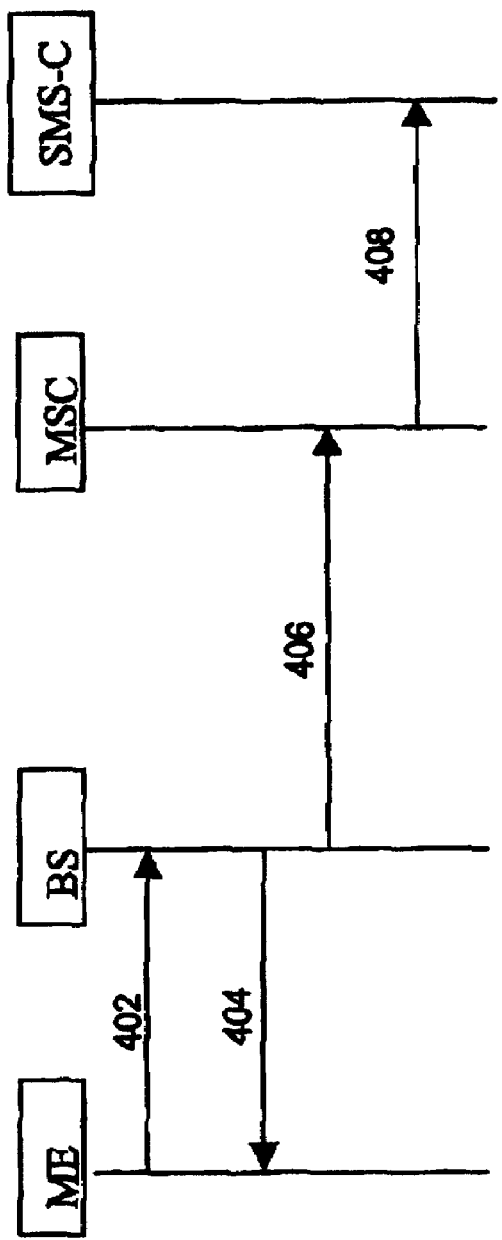
FIG. 4 illustrates an example call flow for SMS delivery solution

FIG. 4 illustrates a SMS delivery call flow mechanism incorporating one aspect of the present invention. When the GSM subscriber originates a MO short message, the CDMA MS 320 retrieves the address of the appropriate service center, for instance the address of GSM SMS-C 350 (FIG. 3), from the GSM SIM card. The address may then be encoded based on a typical GSM SMS encoding scheme. The encoded address is then embedded into a CDMA message as an additional part of the destination address parameter. The MS 320 sends a CDMA message 402, typically a data burst message, to the CDMA BSS 329. The message 402 encapsulates the SMS data and contains both address parameters (i.e., the destination address and the address of the SMS-C). The BSS 329 may respond with a Base Station Acknowledgement Order message 404 which is sent back to the CDMA MS 320. The BSS 329 also sends a message 406, such as an ADDS Deliver message, to the to the hybrid MSC 320. The message 405 contains the SMS message and the address parameters. The destination address parameter is transparent to the CDMA BSS 329. Therefore the present invention may be implemented without modifying the CDMA BSS 329.

Once the message 406 reaches the Hybrid MSC 320, the hybrid MSC will remove all CDMA related headers and extract the embedded destination address. Using the encoded destination address, the Hybrid MSC may then route the SMS message 408 to the appropriate GSM SMS-C in the Core Network, for instance GSM SMS-C 350. The remaining process follows the same procedures used in existing Short Message Service in GSM core networks.

In a typical mobile originated CDMA message, the destination address parameter is one of a number of parameters sent in the message. However, as explained above, when the mobile unit is in a hybrid network where the CN is a GSM network, the destination address parameter includes a parameter length for both the destination address and the GSM service center address. The length of the destination address is filled in the NUM_FIELDS. Thus, the GSM service center address length and the address may be appended to the destination address. The digits of the service center address may be coded as Binary Code Decimal ("BCD"). An example detailed format of one embodiment of a modified destination address parameter is illustrated as follows:

| | | |
|---|---|---|
| Parameter ID | | 1 Byte |
| Parameter Length | | 1 Byte |
| DIGIT_MODE | | 1 BIT |
| NUMBER_MODE | | 1 BIT |
| NUMBER_TYPE | | 0 or 3 bits |
| NUMBER_PLAN | | 0 or 4 bits |
| NUM_FIELDS | | 8 BITS |
| CHARi (note: called MS DN) (multiple occurrences) | | 4 or 8 bits |
| Reserved (note: byte boundary alignment) | | 0 to 7 bits |
| SMS-C address length (in unit of BYTE) | | 1 Byte |
| EXT = 1 | | 1 bit |
| Nature of Address | | 3 bits |
| Numbering Plan | | 4 bits |
| BCD_2 (4 bits) | BCD_1 (4 bits) | 1 Byte |
| . | . | . |
| . | . | . |
| . | . | . |
| 0xF if odd No digits; otherwise the last digit | BCD_(2i+1) (4 bits) | 1 Byte |

The above parameter, therefore, may be inserted into the CDMA SMS message as discussed above.

As those skilled in the art recognize, this disclosure provides examples, for implementing the present invention. These specific examples, and processes are described to help clarify the disclosure. These are, of course, merely examples and are not intended to limit the disclosure from that described in the claims. For instance, although a general switching system is used to describe the HMSC, the present disclosure applies to any switching system that may include one or more network entities which have various call control systems. Such a switching system may serve one or more RANs of different technologies as well as RANs sharing the same technology. The switching system may also link the RANs of various technologies to a CN of a predetermined wireless technology. For instance, a soft switch technology can be used to implement the HMSC which may include two parts each implemented in an independent network entity. One of the two network entities may handle the control part of a call and the other network entity may handle the bearer part. Using soft switch technology to implement the HMSC, the present disclosure provides a maximum leverage of equipment investment since the network configuration becomes highly scalable.

The example embodiments discussed above provide an economical method and system for sending an SMS message from the mobile to the GSM SMS-C in a GSM Core Network by passing addresses of the Hybrid MSC and the GSM SMS-C over the CDMA Radio network. The CDMA SMS protocol is modified, but the embodiment can be implemented without any modifications to any entity between the HMSC and the mobile. Thus, the example embodiment does not introduce modifications to existing architectures in the RAN and CN. This is a advantageous for network operators or service providers because there is no need to invest in upgrading existing equipment in the RAN and CN. The illustrative embodiments can be deployed at relatively low cost and in short deployment times because the core network does not have to be modified.

It will also be understood by those skilled in the art that one or more (including all) of the elements/steps of the present disclosure may be implemented using software and hardware to develop the SMS message creation process at the mobile unit and to develop the message processing and routing mechanism at HMSC.

Furthermore, while the disclosure has been particularly shown and described with reference to the preferred embodiment thereof, it will be understood by those skilled in the art that various changes in form and detail may be made therein without departing from the spirit and scope of the disclosure, as set forth in the following claims.

What is claimed is:

1. A method to pass short message service SMS messages from a mobile unit operating in a CDMA radio access network to a global system for mobile GSM SMS Center in a GSM core network, the method comprising:
    encoding a message into a GSM SMS encoding scheme, wherein the encoding further comprises encoding a destination address and an address for the GSM SMS Center into the GSM SMS message, wherein the address for the GSM SMS Center and a length of the GSM SMS Center address are appended to the destination address;
    inserting the encoded message in a CDMA message;
    sending the CDMA message to a single hybrid mobile switching center (MSC) in accordance with CDMA protocols, the single hybrid MSC at least composed of a radio access network (RAN) of a first technology and a core network (CN) of a second technology, the second technology being different that the first technology of the RAN, the CN operable to communicate to both the CDMA radio access network and a GSM radio access network through the single hybrid MSC;
    receiving the CDMA message at the hybrid MSC;
    removing the CDMA header information to retrieve the encoded message by the hybrid MSC;
    retrieving an address for the GSM SMS Center from the encoded message; and
    sending the SMS message to the GSM SMS Center using the retrieved address in accordance with GSM protocols.

2. The method of claim 1 wherein the inserting further comprises embedding the message into the CDMA message as am additional part of a destination address parameter.

3. The method of claim 1 wherein the sending the CDMA message further comprises sending a data burst message to a Base Station System.

4. The method of claim 1 wherein the encoding the message further includes appending the CDMA destination address with the address of the hybrid MSC.

5. The method of claim 4 wherein the address of the hybrid MSC is coded in a Binary Code Decimal format.

6. A telecommunications system comprising:
    a CDMA radio access network;
    a global system for mobile GSM care network in communication with the CDMA radio access network;
    a single hybrid mobile switching center (hybrid MSC) in communication with both the CDMA radio access network and the GSM core network, such that communications between the CDMA radio access network and the GSM core network are routed through the hybrid MSC, wherein the hybrid MSC contains logic for:
    receiving a CDMA message in accordance with CDMA protocols, wherein the CDMA message contains an encoding GSM message containing a destination address and an address for a GSM short message service SMS Center, wherein the address for the GSM SMS Center and a length of the GSM SMS Center address are appended to the destination address;
    removing CDMA header information to retrieve the encoded GSM message;
    retrieving the address for the GSM SMS Center from the encoded message; and
    sending the SMS message to the GSM SMS Center using the retrieved address in accordance with GSM protocols.

7. The telecommunications system of claim 6 wherein the retrieving the address further includes retrieving the address of the hybrid MSC where the address of the hybrid MSC is coded in a Binary Code Decimal format.

8. A method to pass short message service SMS messages from a mobile unit operating in a CDMA radio access network to a global system for mobile GSM SMS Center in a GSM core network, the method comprising:
    receiving a CDMA message at a hybrid mobile switching center (MSC) in accordance with CDMA protocols, wherein the CDMA message contains an encoding GSM message containing a destination address and an address for the GSM SMS Center, the single hybrid MSC at least composed of a radio access network (RAN) of a first technology and a core network (CN) of a second technology, the second technology being different that the first technology of the RAN, the CN operable to communicate to both the CDMA radio access network and a GSM radio access network through the single hybrid MSC, wherein the address for the GSM SMS Center and a length of the GSM SMS Center address are appended to the destination address;
    removing CDMA header information to retrieve the encoded GSM message;
    retrieving the address for the GSM SMS Center from the encoded message; and
    sending the SMS message to the GSM SMS Center using the retrieved address in accordance with GSM protocols.

9. The method of claim 8 wherein the retrieving the address further includes retrieving the address of the hybrid MSC where the address of the hybrid MSC is coded in a Binary Code Decimal Format.

* * * * *